United States Patent
Jehannet et al.

(10) Patent No.: US 9,850,053 B2
(45) Date of Patent: Dec. 26, 2017

(54) PACKAGING DEVICE AND PACKAGING FOR A WINDSHIELD WIPER HAVING A CURVED BLADE AND AN INTEGRATED FLEXIBLE STRUCTURE

(75) Inventors: Jean-Pierre Jehannet, Vernon (FR); Jocelyn Veret, Etrepagny (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/343,154

(22) PCT Filed: Sep. 6, 2012

(86) PCT No.: PCT/EP2012/067365
§ 371 (c)(1),
(2), (4) Date: Apr. 2, 2014

(87) PCT Pub. No.: WO2013/034619
PCT Pub. Date: Mar. 14, 2013

(65) Prior Publication Data
US 2014/0238886 A1 Aug. 28, 2014

(30) Foreign Application Priority Data
Sep. 6, 2011 (FR) ...................... 11 57899

(51) Int. Cl.
*B65D 75/36* (2006.01)
*B65D 85/68* (2006.01)
*B60S 1/38* (2006.01)

(52) U.S. Cl.
CPC ............ *B65D 75/36* (2013.01); *B60S 1/3879* (2013.01); *B65D 85/68* (2013.01); *B60S 2001/3898* (2013.01); *B65D 2585/6885* (2013.01)

(58) Field of Classification Search
CPC .................. B65D 2585/6885; B65D 75/36; B65D 75/22; B65D 85/68
See application file for complete search history.

(56) References Cited

U.S. PATENT DOCUMENTS 5,772,031 A * 6/1998 Landis ................... A61B 50/33
206/363
8,800,769 B2 * 8/2014 Ehde ..................... B65D 25/103
206/471

(Continued)

FOREIGN PATENT DOCUMENTS

DE 20 2007 005987 U1 8/2007
FR 2 859 713 A1 3/2005

(Continued)

OTHER PUBLICATIONS

International Search Report issued in PCT/EP2012/067365 dated Dec. 6, 2012 (6 pages).

(Continued)

*Primary Examiner* — Anthony Stashick
*Assistant Examiner* — Mollie Impink
(74) *Attorney, Agent, or Firm* — Osha Liang LLP

(57) ABSTRACT

The present invention concerns a packaging device (1) for a wiper blade (100) comprising a curved blade (110) and an integrated flexible structure (120), said packaging device (1) comprising a shell (14) delimiting a housing (10) intended for receiving the blade (100) and defining holding means (20) intended for securing said blade (100) inside said housing (10) in a position that can be at least partially upright in relation to its rest position, the holding means (20) comprising: a first bearing surface (21) capable of engaging by contact with a portion (141) of the upper part (140) of the blade (100), second and third bearing surfaces (22, 23) formed in the base of the housing (10) and capable of engaging by contact with the flexible structure (120) of said blade (100), the first bearing surface (21) extending facing an area located between the second bearing surface (22) and (Continued)

the third bearing surface (23), characterized in that at least one of the second and third bearing surfaces (22, 23) has a stop, referred to as the second stop, which is capable of engaging by contact with a lateral end (123) of the flexible structure (120), said second stop being arranged such that, in the stop position, at least a part of a projection (112) of the blade (110) is held away from the shell (14). The present invention also concerns a packaging for a wiper blade.

13 Claims, 2 Drawing Sheets

(56) References Cited

U.S. PATENT DOCUMENTS

2007/0017842 A1* 1/2007 Clamagirand et al. ....... 206/471

2010/0307940 A1* 12/2010 Kim ...................... B65D 75/22
  206/349
2012/0111858 A1* 5/2012 Lewis .................... B65D 77/26
  220/4.23

FOREIGN PATENT DOCUMENTS

| FR | 2 918 024 A1 | 1/2009 |
| FR | 2 927 615 A1 | 8/2009 |
| WO | 2005/026005 A1 | 3/2005 |
| WO | 2010/022949 A1 | 3/2010 |

OTHER PUBLICATIONS

Written Opinion of the International Searching Authority issued in PCT/EP2012/067365 dated Dec. 6, 2012 (6 pages).

* cited by examiner

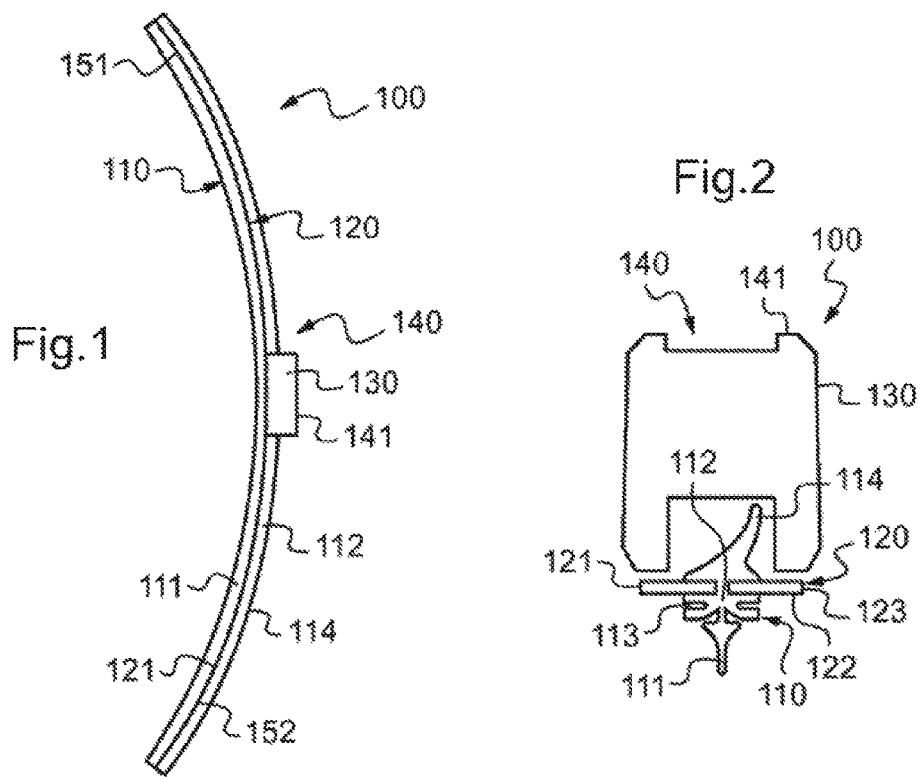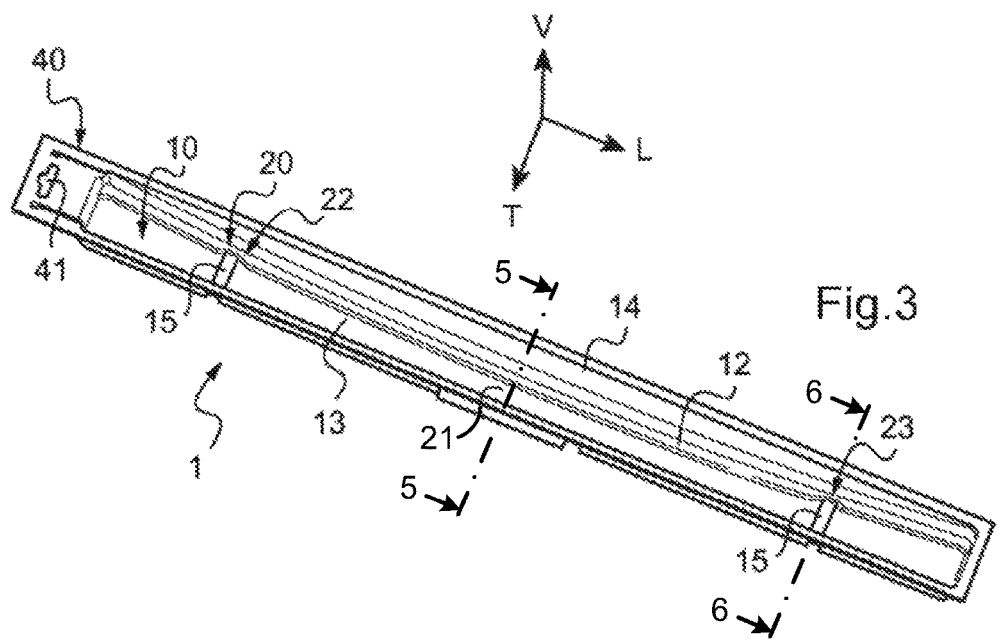

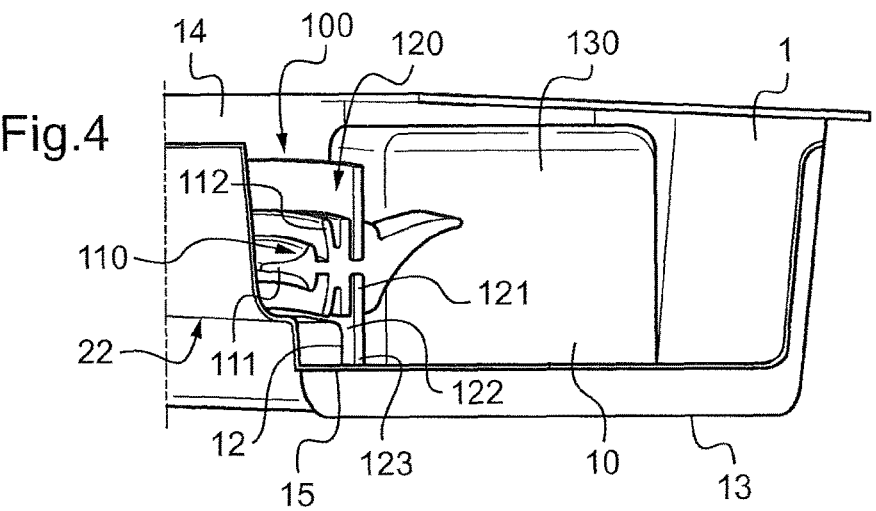
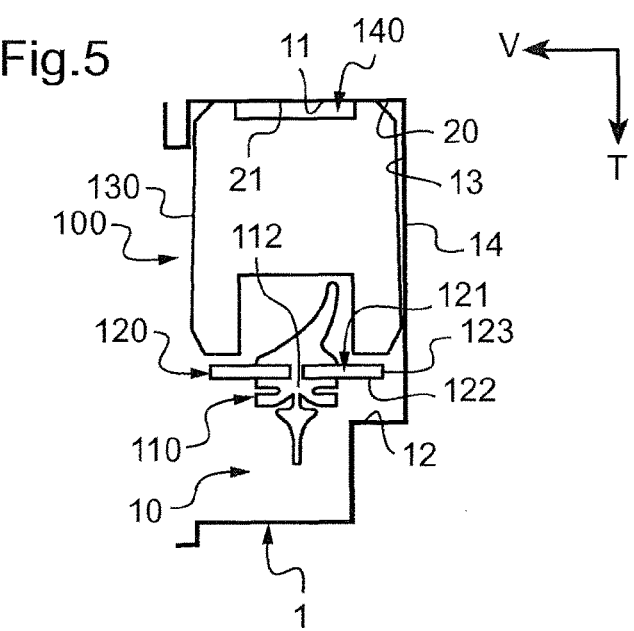
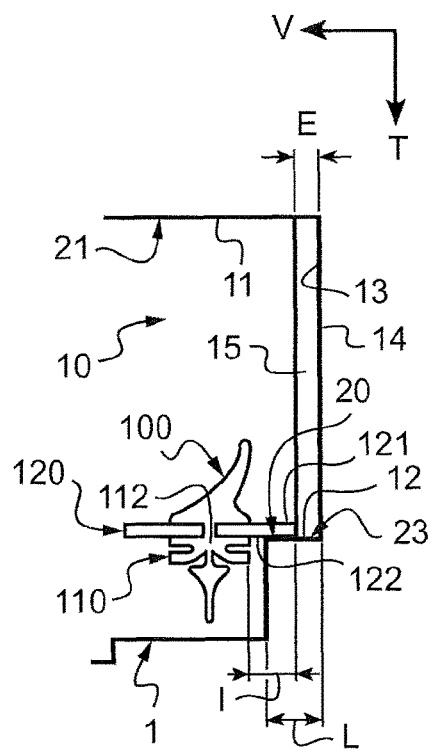

PACKAGING DEVICE AND PACKAGING FOR A WINDSHIELD WIPER HAVING A CURVED BLADE AND AN INTEGRATED FLEXIBLE STRUCTURE

The present invention relates to a packaging device intended for packaging a windshield wiper provided with a curved blade having an integrated flexible structure. The packaging housing the windshield wiper blade is used for example in the field of spare parts for motor vehicles.

Some windshield wipers have the particular feature of not having yoke structures, in contrast to the straight wipers commonly employed at present. These wipers still have a flexible squeegee blade, but the external reinforcement for supporting it is replaced with a flexible structure which is directly integrated into the blade. The assembly is designed such that, at rest, the blade has a concave shape longitudinally in its sagittal plane, but in contact with the surface to be wiped, said blade is able to straighten by elastic deformation of its flexible structure in order to conform best to said surface throughout its movement.

Precisely on account of its curved shape, a windshield wiper having a curved blade has, at rest, a space requirement greater than its counterpart having a yoke structure and a straight blade. Consequently, its packaging proves to be much more problematic since it is not conceivable to use a simple blister pack having a complementary shape. Specifically, the volume of the packaging must be relatively small essentially for reasons of manufacturing costs, environmental protection and logistics.

In order to remedy this difficulty, it is known to use packaging provided with holding means that are able to fix the wiper inside a housing, in an at least partially straightened position compared with its rest position.

International application WO 2005/026005 describes in particular a packaging device for a windshield wiper having a curved blade and an integrated flexible structure, having a housing intended to receive the wiper and also holding means for fixing the wiper inside the housing in a position that can be at least partially straightened compared with its rest position.

The holding means have a first bearing surface that is able to cooperate by contact with a portion of the upper part of the wiper, a second bearing surface that is able to cooperate by contact with a first portion of the lower part of the wiper, and a third bearing surface that is able to cooperate by contact with a second portion of the lower part of the wiper, the first bearing surface extending opposite a region located between the second bearing surface and the third bearing surface.

The packaging device has the advantage of being extremely convenient to use. The fact that the holding means of the packaging device are intended to cooperate with parts of the wiper that are truly external and opposite in the sagittal plane implies that the corresponding bearing surfaces are positioned in a manner approximately opposite and at a distance from one another, consequently making them particularly accessible.

In order to be put in place, the wiper simply has to be straightened in its sagittal plane, without it being necessary to give it a particular curvature. Once positioned between the holding means, the wiper is released until its upper part and its lower part come into contact with the corresponding bearing surfaces. The elastic return force, brought about by the tensioning of the flexible structure between the different bearing surfaces, thus fixes the windshield wiper within the housing.

The second bearing surface and the third bearing surface are for example provided on parts of the blade which are adjacent to the lip, so as to be able to cooperate by contact with the heel of the blade. This thus avoids contact between the lip and the packaging device.

According to a particular embodiment, the second and third bearing surfaces are able to cooperate by contact with the flexible structure integrated in the heel of the blade. It is thus one of the tabs of the flexible structure which cooperates by contact with the packaging device. This thus avoids any contact between the packaging device and the blade.

However, depending on the particular configuration of the windshield wiper to be packaged, such as its weight, its size or the shape of its connector, it is possible for the heel of the blade to nevertheless come into contact with the packaging device. The blade can thus be subjected to pressure at these locations, with the risk of it being deformed.

In order to solve these and other problems, the invention proposes a packaging device for a windshield wiper having a curved blade and an integrated flexible structure, making it possible to ensure that the blade is protected, regardless of the shape of the windshield wiper.

To this end, the subject of the present invention is a packaging device for a windshield wiper having a curved blade and an integrated flexible structure, said packaging device having a shell delimiting a housing intended to receive the wiper and defining holding means for fixing said wiper inside said housing in a position that can be at least partially straightened compared with its rest position, the holding means having:

a first bearing surface that is able to cooperate by contact with a portion of the upper part of the wiper, a second and a third bearing surface that are provided in the bottom of the housing and are able to cooperate by contact with the flexible structure of said wiper, the first bearing surface extending opposite a region located between the second bearing surface and the third bearing surface, characterized in that at least one of the second and third bearing surfaces has an abutment, known as the second abutment, which is able to cooperate by contact with a lateral end of the flexible structure, said second abutment being designed such that, in the position of abutment, at least a part of a heel of the blade is kept spaced apart from the shell.

The expression "spaced apart" is understood to mean here that said part of the heel of the blade is located at a non-zero distance from said shell in a direction of lateral extension of the flexible structure.

According to one or more features of the packaging device, taken separately or in combination:

the wiper blade has a single heel, the wiper blade has a single lip, the second abutment is designed such that, in the position of abutment, the heel of the blade is kept spaced apart from the shell. It is understood here that the heel of the blade is advantageously spaced apart from the shell over the entirety of one lateral face of said blade, at least one of the second and third bearing surfaces has an abutment, known as the first abutment, which is able to cooperate by contact with a lower face of the flexible structure, said first abutment being designed such that, in the position of abutment, at least a part of a lip of the blade is kept at a distance from the shell. The expression "at a distance" is understood here to mean that said part of the lip is located at a non-zero distance from said shell in a direction of longitudinal extension of said blade, that is to say in a direction approximately perpendicular to a direction of lateral extension of the flexible structure, the first abutment is designed such that, in the position of abutment, the lip of the blade is kept at a distance from the shell. In this variant embodiment, the entirety of said lip is thus advantageously located at a non-zero distance from said shell in a direction of longitudinal extension of said blade, that is to say in a direction approximately parallel to the sagittal plane of the windshield wiper, the first and second abutments form an angle having a shape complementary to the shape of the lateral end of the flexible structure, the flexible structure has two vertebrae integrated longitudinally into the blade, respectively on opposite lateral faces of the blade, and the lateral end of the flexible structure belongs to one of the vertebrae, the first abutment is formed by a longitudinal edge that is able to cooperate by contact with the lower face of the flexible structure of said wiper, the first abutment of the second bearing surface and the first abutment of the third bearing surface are formed on one and the same longitudinal edge, the second abutment(s) is (are) formed by a transverse rib projecting from the bottom wall of the housing, said transverse rib having a projecting thickness at least equal to the difference between the projecting thickness of the longitudinal edge with respect to the bottom wall of the housing and the length of the flexible structure projecting from the blade of the wiper intended to be received in the housing, the first bearing surface is able to cooperate by contact with an approximately central portion of the upper part of the wiper, the second bearing surface and the third bearing surface are respectively able to cooperate by contact with portions approximately at the longitudinal ends of the flexible structure of said wiper, the wiper has on its upper part a connecting element intended to allow it to be mounted on a drive mechanism, and the first bearing surface is able to cooperate by contact with said connecting element, the shell is substantially rigid, the shell is produced in one piece.

The subject of the invention is thus likewise a packaging device for a windshield wiper having a curved blade and an integrated flexible structure, said packaging device having a shell delimiting a housing intended to receive the wiper and defining holding means for fixing said wiper inside said housing in a position that can be at least partially straightened compared with its rest position, the holding means having:

a first bearing surface that is able to cooperate by contact with a portion of the upper part of the wiper, a second and a third bearing surface that are provided in the bottom of the housing and are able to cooperate by contact with the flexible structure of said wiper, the first bearing surface extending opposite a region located between the second bearing surface and the third bearing surface, characterized in that the second and third bearing surfaces respectively have a first abutment that is able to cooperate by contact with a lower face of the flexible structure of said wiper and a second abutment that is able to cooperate by contact with the lateral end of the flexible structure, the second abutment being designed such that, in the position of abutment, the heel of the blade is kept spaced apart from the shell.

The subject of the invention is also packaging for a windshield wiper, having a packaging device as defined above and a windshield wiper having a curved blade and an integrated flexible structure, said wiper being received in the housing of said packaging device.

In order to be put in place, the blade simply has to be straightened in its sagittal plane. Once positioned between the holding means, the wiper is released until its upper part and the flexible structure come into contact with the corresponding bearing surfaces. The elastic return force brought about by the tensioning of the flexible structure between the different bearing surfaces thus fixes the windshield wiper within the housing.

Once put in place, at the second and third bearing surfaces, the flexible structure of the wiper is in abutment with the longitudinal edge, ensuring that the wiper is fixed transversely in the housing, and also with the transverse rib, limiting the depression of the blade wiper into the bottom of the housing and thus preventing the heel of the blade from coming into contact with the shell. Thus, any contact between the packaging device and the blade is prevented, whether this be in the region of the lip or in the region of the parts of the blade that are adjacent to the lip, such as the heel. The blade, freed of any stress at all the bearing points, cannot be deformed by its packaging.

This description, which is given by way of nonlimiting example, will make it easier to understand how the invention can be realized, with reference to the appended drawings, in which:

FIG. 1 schematically illustrates an example of a windshield wiper that can be packaged in a packaging device.

FIG. 2 is a central cross-sectional view of the windshield wiper blade from FIG. 1.

FIG. 3 shows a packaging device.

FIG. 4 shows the positioning of the windshield wiper from FIGS. 1 and 2 inside the housing of the packaging device from FIG. 3. In this figure, the packaging device is laid flat.

FIG. 5 is a schematic cross-sectional view of another packaging example, realized at the center of the windshield wiper.

FIG. 6 corresponds to a schematic cross-sectional view of the packaging from FIG. 5, but this time realized in the region of one of the areas of contact of the windshield wiper.

For reasons of clarity, the same elements have been designated by identical references. Similarly, only the elements that are essential for understanding the invention have been shown, not to scale and schematically.

In the rest of the description, the directions longitudinal, vertical and transverse that are indicated in FIG. 3 by the fixed trihedral frame of reference (L, V, T) with respect to the packaging device will be adopted in a nonlimiting manner. The longitudinal direction L corresponds to the main direction of the windshield wipers in the flat state. In the illustration of the holding device 1, the horizontal plane corresponds to the plane (L, T).

The orientations "top" and "bottom" of the packaging device are designated with reference to the orientation of the packaging device laid flat, as shown in FIG. 4. The orientation top given with reference to the packaging designates the side on which the housing of the packaging device is opened.

The orientation "upper" given with reference to the windshield wiper designates the side of the spoiler and the orientation "lower" given with reference to the windshield wiper designates the side of the wiper blade.

FIG. 1 schematically illustrates a windshield wiper 100 having a curved blade 110 and an integrated flexible structure 120, this being particularly intended to be installed on a motor vehicle. It should be noted that in this field such a wiper element is often known as flat blade on account of its low height; this feature resulting precisely from the lack of a yoke reinforcement. In any case, in this representation in the rest position, the curved shape of the blade 110 which is imposed by the curved profile of the flexible structure 120 is clearly visible.

As can be seen more clearly in FIG. 2, the blade 110 of the wiper 100 consists conventionally of a single lip 111 that is intended to cooperate directly by sliding contact with a surface to be wiped, and of a single heel 112 that forms an interface between said lip 111 and the flexible structure 120. On account of their respective functions, the lip 111 is particularly hard and wear-resistant, while the heel 112 provides the flexibility necessary for the optimal reversal of the blade 110 during changes in wiping direction. It should be noted that this flexibility results in this case primarily from the particular cutting of the heel 112 of the blade 110, and in particular from the presence of longitudinal grooves 113.

A spoiler 114, which is also conventionally an integral part of the upper part of the heel 112, is also visible. The blade 110 in fact consists of an elastomer profile which combines the lip 111, the heel 112 and the spoiler 114 in one assembly.

The flexible structure 120 has two elastically deformable tabs 121 which are integrated longitudinally into the blade, respectively on opposite lateral faces of the blade 110. Each tab 121, commonly known as a vertebra, is intended to distribute the bearing pressure homogeneously along the entire length of the blade 110 in order to optimize wiping quality. They are metallic in this exemplary embodiment.

A connecting element 130, which is also conventionally intended to allow the wiper 100 to be mounted on a drive mechanism, can also be seen. In order to fulfill its function, the connecting element 130 is secured to the upper part 140 of the wiper 100 and it has a structure that is able to engage by assembly with the complementary connecting means provided at the end of the actuating arm of the associated drive mechanism.

FIG. 3 shows a packaging device 1 which is intended to act as packaging for the above-described windshield wiper 100.

The packaging device 1 has a shell 14 which, in this example, is substantially rigid and produced in one piece. It is a sort of envelope having a small thickness, which, however, affords mechanical strength compatible with its function of protective packaging. The shell 14 may be light-permeable, that is to say transparent or translucent, so as to keep the wiper 100 visible when it is packaged in the packaging device 1, highlighting the particularity of the appearance of this type of wiper 100 having a curved blade 110 and an integrated flexible structure 120, in particular compared with straight wipers that are commonly used. In this exemplary embodiment, the shell 14 is thus produced from plastics material, in this case transparent amorphous PET, and has a thickness of around 500 pm.

The shell 14 defines a housing 10 intended to receive the wiper 100, and also holding means 20 for fixing said wiper 100 inside said housing 10 in a partially straightened position compared with its rest position.

The holding means 20 first of all have a first bearing surface 21 which is able to cooperate by contact with a portion 141 of the upper part 140 of the wiper 100. The holding means 20 are also provided with a second bearing surface 22 which is provided in the bottom of the housing 10 and is able to cooperate by contact with the flexible structure 120 of the wiper 100. The holding means 20 are finally provided with a third bearing surface 23, which is likewise provided in the bottom of the housing 10 and is able to cooperate by contact with the flexible structure 120 of the wiper 100.

The assembly is provided such that the first bearing surface 21 extends opposite a region located between the second bearing surface 22 and the third bearing surface 23. The three bearing surfaces 21, 22, 23 are thus positioned in a triangle in a manner spaced apart from one another, this making it possible to effectively provide holding at three points.

The second and third bearing surfaces 22, 23 respectively have, here, an abutment, known as the first abutment, which is able to cooperate by contact with a lower face of the flexible structure 120 of said wiper 100, and an abutment, known as the second abutment, which is able to cooperate by contact with the lateral end of the flexible structure 120.

The second abutment is in this case designed such that, in the position of abutment, the heel of the blade 110 is kept spaced apart from the shell 14.

In the illustration shown in FIGS. 4 and 6, the two abutments are consecutive and perpendicular to one another. They form an angle having a shape complementary to that of the end of the vertebra 121 of the flexible structure 120.

The first abutment is formed by the upper surface of a longitudinal edge 12 that is able to cooperate by contact with a lower face 122 of the vertebra 121 of the flexible structure 120 of the wiper 100. The second abutment is formed by the upper surface of a transverse rib 15 projecting from the bottom wall 13 of the housing 10. The transverse rib 15 is able to cooperate by contact with the lateral end 123 of the vertebra 121 of the flexible structure 120.

On account of the nature of the shell 14, the two transverse ribs 15 are in the form of hollow ribs (FIG. 3), but of course solid ribs may very easily be used. In the example illustrated, the ribs 15 extend transversely from one side to the other in the bottom of the housing 10.

The transverse ribs 15 respectively have a thickness E with respect to the bottom wall 13 (FIG. 6), said thickness E being at least equal to the difference between the thickness L of the longitudinal edge 12 with respect to the bottom wall 13 and the length l of the vertebra 121 projecting from the blade 110, such that, in the position of abutment, the blade 110 is held at a distance from the shell 14.

In order to be put in place, the wiper 100 simply has to be straightened in its sagittal plane. Once positioned between the holding means 20, the wiper 100 is released until its upper part 140 and the vertebra 121 of the flexible structure 120 come into contact with the corresponding bearing surfaces 21, 22, 23. The elastic return force brought about by the tensioning of the flexible structure 120 between the different bearing surfaces 21, 22, 23 thus fixes the windshield wiper 100 within the housing 10.

Once put in place, and as can be seen in FIG. 4, at the second and third bearing surfaces 22, 23, the lower face 122 of the vertebra 121 is in the position of abutment against the longitudinal edge 12, immobilizing the wiper 100 transversely in the housing 10. Moreover, the lateral end 123 of the vertebra 121 is in the position of abutment against the transverse rib 15, thereby limiting the introduction of the wiper 100 into the bottom of the housing 10 and thus preventing the heel 112 from coming into contact with the shell 14.

Thus, any contact between the packaging device 1 and the blade 110 is prevented, whether this be in the region of the lip 111 or in the region of the parts of the blade that are adjacent to the lip, such as the heel 112. The heel 110, freed of any stress that all the bearing points, cannot be deformed by its packaging.

In addition, each metallic tab 121 has a hardness much greater than that of the elastomer of which the blade 110 is made, and thus forms a contact surface which is considerably more stable, and hence good holding.

According to further particular features of the example illustrated, the three bearing surfaces 21, 22, 23 are provided such that the first bearing surface 21 is able to cooperate by contact with an approximately central portion 141 of the upper part 140 of the wiper 100, and such that the second bearing surface 22 and the third bearing surface 23 are respectively able to cooperate by contact with portions 151, 152 that are generally at the longitudinal ends of the flexible structure 120 of the wiper 100. The fact that holding is realized at the respective upper end 140 and lower ends 151, 152 of the wiper 100 makes it possible to free the space located to the sides of the wiper.

The first bearing surface 21 is for example provided substantially at the same distance from the second bearing surface 22 and the third bearing surface 23. This specificity allows homogeneous distribution of the pressure forces which are brought about by the elastic deformation of the flexible structure 120 and which originate from the holding of the wiper 100 within the housing 10.

The first bearing surface 21 consists for example of a wall portion laterally delimiting the housing 10.

In this exemplary embodiment, the wiper 100 has a connecting element 130 positioned in its upper part 140, such that it is advantageous for the first bearing surface 21 to be able to cooperate by contact with the connecting element 130 in question.

According to another particular feature of the invention, the second bearing surface 22 and the third bearing surface 23 consist of portions of the same edge 12 provided longitudinally at the bottom of the housing 10.

As can be seen in FIG. 3, the packaging device 1 is furthermore provided with hooking means 40 which are able to allow it to be hung in a position corresponding to a substantially vertical position of the wiper 100. In this exemplary embodiment, the hooking means 40 consists of a conventional through-hole 41 which is shaped so as to be able to cooperate with a fastening hook of any display.

FIGS. 5 and 6 illustrate in detail the holding of the wiper 100 in a housing 10 at the different contact points.

FIG. 5 is concerned more particularly with the relative positioning in the central part. It shows in particular the immobilization that is realized between the lateral wall 11 delimiting the housing 10 and the upper part 140 of the wiper 100, said upper part 140 being embodied by the connecting element 130. The blade of the wiper 100 is for its part not subjected to any stress at this precise location.

For its part, FIG. 6 shows the positioning of each longitudinal end of the wiper 100 in the housing 10. It will be noted that, in this region, only the vertebra 121 of the wiper 100 is in contact with the edge 12 provided longitudinally at the bottom of the housing 10 and with the transverse rib 15 projecting from the bottom wall 13 of the housing. The blade of the wiper 100 is not subjected to any stress at these other bearing points.

The invention claimed is:

1. A packaging device for a windshield wiper, having a curved shape when in a resting position, comprising a curved blade and an integrated flexible structure, said packaging device comprising:
   a shell defining external borders that are straight along a longitudinal axis, the external boarders defining:
      a housing configured to receive the windshield wiper,
      a holding means configured to:
         hold said windshield wiper inside said housing, and
         at least partially straighten the curved shape of the windshield wiper when holding the windshield wiper,
      an opening configured to allow the windshield wiper to be placed in the housing, and
      a bottom wall disposed opposite the opening; and
   the holding means configured to prevent the curved blade from contacting the shell when the windshield wiper is disposed in the housing, the holding means comprising:
      a first bearing surface configured to contact a portion of the windshield wiper that is not the curved blade; and
      a second bearing surface and a third bearing surface that are disposed on the bottom wall and on a longitudinal edge of the shell and are configured to contact the integrated flexible structure of said windshield wiper when the windshield wiper is disposed in the housing,
   wherein at least one of the second and third bearing surfaces comprises a second abutment configured to contact a lateral end of the integrated flexible structure, and
   wherein said second abutment comprises a transverse rib projecting from the bottom wall,
   wherein at least one of the second and third bearing surfaces comprises a first abutment configured to contact a lower face of the integrated flexible structure,
   wherein said first and second abutments form an angle of 90 degrees.

2. The packaging device as claimed in claim 1, wherein is designed such that, in the position of abutment, at least a part of a lip of the blade is kept at a distance from the shell.

3. The packaging device as claimed in claim 2, wherein the longitudinal edge comprises said first abutment.

4. The packaging device as claimed in claim 2, wherein the second and third bearing surfaces have the first abutment that is able to cooperate by contact with a lower face of the flexible structure of said wiper and the second abutment that is able to cooperate by contact with the lateral end of the flexible structure, the second abutment being designed such that, in the position of abutment, the heel of the blade is kept spaced apart from the shell.

5. The packaging device as claimed in claim 4, wherein said first abutment of the second bearing surface and said first abutment of the third bearing surface are formed on the same longitudinal edge.

6. The packaging device as claimed in claim 1, wherein the first bearing surface is able to cooperate by contact with an approximately central portion of the upper part of the wiper, and wherein the second bearing surface and the third bearing surface are respectively able to cooperate by contact with portions approximately at the longitudinal ends of the flexible structure of said wiper.

7. The packaging device as claimed in claim 1, wherein the wiper has on its upper part a connecting element intended to allow it to be mounted on a drive mechanism, and wherein the first bearing surface is able to cooperate by contact with said connecting element.

8. The packaging device as claimed in claim 1, wherein the shell is substantially rigid.

9. The packaging device as claimed in claim 8, wherein the shell is produced in one piece.

10. A wiper assembly of a packaging and a windshield wiper, comprising:
  the windshield wiper having a curved blade and an integrated flexible structure; and
  a packaging device having a shell defining external borders that are straight along a longitudinal axis, the shell delimiting a housing defining holding means for fixing the windshield wiper, the holding means having:
    a first bearing surface;
    a second and a third bearing surface that are provided in a bottom of the housing, wherein the second bearing surface is provided within a region along one half of a longitudinal edge of the holding means, the third bearing surface is provided within a region along the other half of the longitudinal edge of the holding means, and
    wherein the first bearing surface extending opposite a region located between the second bearing surface and the third bearing surface,
    wherein at least one of the second and third bearing surfaces has a first abutment cooperating by contact with a lower face of the flexible structure, said first abutment being designed such that, in position of abutment, at least a part of a lip of the blade is kept at a distance from the shell, and
    at least one of the second and third bearing surfaces has a second abutment;
  said wiper being received in the housing of said packaging device and said wiper inside said housing in a position that can be at least partially straightened compared with a rest position,
  the first bearing surface cooperating by contact with a portion of the upper part of the wiper,
  the second and the third bearing surfaces cooperating by contact with the flexible structure of said wiper, and
  the second abutment cooperating by contact with a lateral end of the flexible structure, said second abutment being designed such that, in the position of abutment, at least a part of a heel of the blade is kept spaced apart from the shell,
  wherein said second abutment(s) is (are) formed by a transverse rib projecting from a bottom wall of the housing, said transverse rib having a projecting thickness at least equal to a difference between a projecting thickness of the longitudinal edge with respect to the bottom wall of the housing and a length of the flexible structure projecting from the blade of the windshield wiper,
  the packaging device further comprising a top designating a side on which the packaging device is opened, wherein the bottom wall of the housing is opposite the top of the packaging device.

11. The wiper assembly as claimed in claim 10, wherein said first and second abutments form an angle having a shape complementary to the shape of the lateral end of the flexible structure.

12. The wiper assembly as claimed in claim 11, wherein the flexible structure has two vertebrae integrated longitudinally into the blade, respectively on opposite lateral faces of said blade, and wherein said lateral end belongs to one of said vertebrae.

13. A packaging device for a windshield wiper having a curved blade and an integrated flexible structure, said packaging device having a shell comprising external borders straight along a longitudinal axis, said shell delimiting a housing intended to receive the wiper and defining holding means for fixing said wiper inside said housing in a position that can be at least partially straightened compared with its rest position, the holding means having:
  a first bearing surface that is able to cooperate by contact with a portion of the upper part of the wiper; and
  a second and a third bearing surface that are provided on a bottom wall and a longitudinal edge of the housing and are able to cooperate by contact with portions at the longitudinal ends of a lower part of the flexible structure of said wiper, wherein the second bearing surface is provided within a region along one half of a longitudinal edge of the holding means, the third bearing surface is provided within a region along the other half of the longitudinal edge of the holding means, and the first bearing surface extending opposite a region located between the second bearing surface and the third bearing surface,
  wherein at least one of the second and third bearing surfaces has an abutment, known as the first abutment, which is able to cooperate by contact with a lower face of the flexible structure, said first abutment being designed such that, in the position of abutment, at least a part of a lip of the blade is kept at a distance from the shell,
  wherein at least one of the second and third bearing surfaces has an abutment, known as the second abutment, which is designed to cooperate by contact with a lateral end of the flexible structure, said second abutment being designed such that, in the position of abutment, at least a part of a heel of the blade is kept spaced apart from the shell, wherein said first and second abutments form an angle of 90 degrees, and
  wherein said second abutment is formed by a transverse rib projecting from the bottom wall of the housing,
  the packaging device further comprising a top designating a side on which the packaging device is opened, wherein the bottom wall of the housing is opposite the top of the packaging device.

* * * * *